Feb. 13, 1962 J. HARNISCH ETAL 3,021,144

RECORD CHANGING MECHANISM

Filed Dec. 22, 1958

Inventors
JOACHIM HARNISCH
HANS HERMANN
BY
Barnes, Kisselle, Raisch & Choate
ATTYS.

United States Patent Office 3,021,144
Patented Feb. 13, 1962

3,021,144

RECORD CHANGING MECHANISM

Joachim Harnisch, Bundesstrasse 1a, and Hans Hermann, Sommeranerstrasse 14, both of St. Georgen, Black Forest, Germany Filed Dec. 22, 1958, Ser. No. 782,113
Claims priority, application Germany Dec. 21, 1957
10 Claims. (Cl. 274—10)

Figures 1, 2, 3:
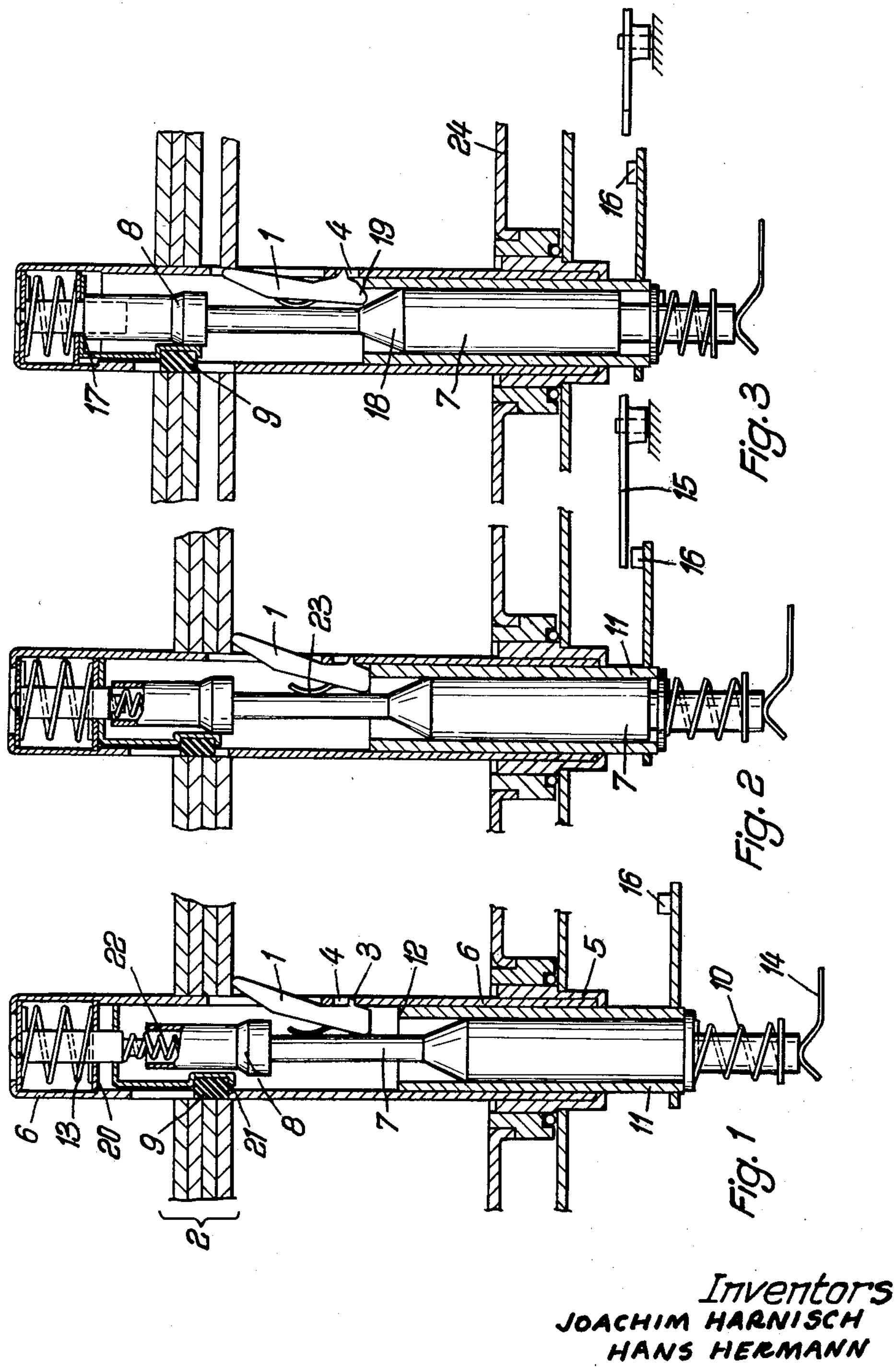

This invention relates to a record changing mechanism in which the records are supported in the centre about the turntable axle by means of two noses or tongues adapted to be alternatively projected or spread from said axle and being axially spaced from each other by approximately the thickness of a record, said noses or tongues supporting the stack of records in such a manner that at any time only the lowermost record will be released to descend for being placed onto the turntable.

In a known mechanism the lower stack supporting member is continuously urged in axial direction in opposition to the gravity of the stack of records by a spring the force of which is somewhat smaller than the weight of the lightest records. After the last record of the stack having descended onto the turntable, the lower stack supporting member is moved upwardly under the action of said spring and causes after the reproduction of the last record having been completed the phonograph to be cut-out. Such mechanism is exceedingly delicate owing to the low weight of modern plastic records.

In another known mechanism the next to the lowermost record of the stack is stopped by urging the upper one of the noses which are alternately spread out from the turntable axle against the centre hole edge of said record. However, if only one record is left in the stack, the clamping noses make an idle stroke because there is no record centre hole limiting the motion thereof. This idle stroke is utilized to prepare the disconnection of the phonograph. If now only one record is still left in the stack the changing cycle comprising record changing and tone arm control must not yet be influenced though the idle stroke is already effective, because the pick-up will have to be brought again to its reproduction position after this last record has descended and the changing cycle will have to be started again after the reproduction of this last record to return the pick-up to its position of rest. This mechanism has the drawback that this idle stroke may be utilized only for preparing the disconnection and that separate means are required effecting the drive only after expiration of the next changing cycle.

In a further known mechanism the lowermost record of the stack is contacted by means of a feeler provided within the central guide pin. If the last record of the stack has been descended this feeler will be spread from the pin thus blocking the actuating member of the descending device. This blocking causes a relative motion between the actuating member and its drive member, this relative motion effecting the disconnection of the phonograph. Such mechanism has the drawback that the record cannot slide without friction along the guide pin because of the feeler so that the record must have a certain minimum weight for properly descending. This known device is only suitable for records with a large center hole since with a pin diameter of 0.27" the accommodation of a feeler would meet with difficulties owing to the restricted space available for this feeler which must be provided in the immediate vicinity of the stack supporting members.

The object of this invention is to eliminate these drawbacks and to provide a device which in combination with a central guiding pin of any desired diameter assures on the one hand a reliable changing of records and on the other a reliable disconnection of the phonograph after the reproduction of the last record. For this purpose the invention makes use of means known as such comprising holding and supporting members capable of being displaced in axial direction with relation to each other, a control element being resiliently and operably connected to one of the groups of members.

Accordingly this invention relates to an improvement for a post or axle located in the center of a turntable for the stacking of records, this axle being provided with two elements or groups of elements adapted to be alternatively projected or spread out therefrom, said elements being constituted by supporting noses or tongues spaced in axial direction by about the thickness of one record and shiftable in axial direction with relation to each other, said noses or tongues holding the records in such a manner that during each operating cycle at any time only the lowermost record is released for descending onto the turntable, one of said groups of elements being operably connected to an actuating member by means of a control member (stroke member) for being resiliently displaced in axial direction. The stacking axle according to the invention is so designed that the approachment of the group of elements is limited by the lowermost record of the stack and that after the last record having descended and after removal of said limitation the control member (stroke member) operably and resiliently coupled with said one group of elements together with an element secured thereto actuates the disconnecting device of the phonograph.

The invention will now be described in greater detail, reference being had to the accompanying drawing, in which FIGS. 1 to 3 show by way of example an embodiment of the invention in different working positions.

FIG. 1 shows the position of the parts at the beginning of the operating cycle. The stack of records 2 is held only by the lower supporting elements 1 of which only one is shown and which are supported within a slot 4 of a sleeve member 6 rigidly connected at 5 with the casting 6 of the mechanism. At the beginning of the upward movement of the lifting rod 7 which is caused by the actuating member 14 being raised first the conical portion 8 of the lifting rod engages the upper supporting element 9 formed of a resiliently compressible material, of which only one is shown, thereby moving the latter upwardly until it abuts the disc 20 of the biassed spring 13. Further upward movement of the lifting rod causes the cone 8 to urge the supporting member 9 against the center hole of the stack of records 2 with the exception of the lowermost record. The lifting rod 7 carries with it also the stroke member or control member 11 resting upon the spring 10 which stroke member in the meantime has contacted the lower supporting members 1 by means of its upper edge 12. Upon still further upward movement of the lifting rod 7 the spring 10 is compressed since the stroke member 11 is fixed in its position relative to the sleeve member 6 by means of the supporting members 1, the stack of records 2, the supporting members 9, and a biassed spring 13. The actuating member 14 is operatively associated in a manner not shown by means of the driving mechanism with the switch member 15 for the tone arm control such that the switch member is passing in horizontal direction the pin 16 just in the moment in which the lifting rod 7 assumes the position last described (FIG. 2). Hereby the path of travel of the switch member 15 is not affected and the pick-up is travelling in its normal path.

When no record is left in the magazine the lifting rod 7 is carrying along with it, by means of the spring 10 and the stroke member 11, the supporting members 1 until the latter abut the upper edge of the slot 4. Accordingly also the pin 16 will be raised. Thus the travelling motion of the switch member 15 is stopped which in turn switches the travel path of the pick-up to "return to resting support" thus preventing it from pivoting into its position of reproduction. An electric switch is provided in the resting support which upon the pick-up being placed thereon disconnects the phonograph.

If there are still records in the magazine the further mode of operation is as follows. When the lifting rod 7 continues to move upwards its upper end 17 carries with it the supporting members 9 and accordingly the whole stack of records. Also the lowermost record is carried along by the supporting members 1 since the force of the biassed spring 10 is greater than the heaviest record. After the lifting motion has advanced far enough that the supporting members 1 have reached the upper edge of the slot 4 the lowermost record is withheld while the remaining stack of records continues to move upwards some distance. In the meantime the lower cone-shaped portion of the lifting rod 7 has reached the lower arm 19 of the supporting members 1 so that the latter will be pressed into the axle and the lowermost record may descend onto the turntable 24.

When the lifting rod 7 descends, the position of the cone-shaped portion 8 with respect to the supporting members 9 initially remains unchanged while the stack of records also descends until the supporting members 9 abut against the edge 21 of the sleeve member 6. Now, under the action of the spring 22 the lifting rod 7 will be urged downwardly. At the same time the supporting members 1 will be spread out under the action of the springs 23 and reach their lowermost position. Upon further downward movement of the lifting rod 7 the cone-shaped portion 8 leaves the supporting members 9 which return into the sleeve member 6 so that the stack of records is supported on the supporting members 1, whereby one operation cycle is completed.

When only one record remains in the stack, upward movement of cone 8 to the FIG. 2 position shifts supporting members 9 outwardly over the upper face of the remaining record in the stack so that the bottom surfaces of supporting members 9 will prevent any substantial upward movement of the record until the upper end of the lifting rod begins to compress spring 13. Consequently by engagement of supporting members 9 with the upper surface of the record, upward movement of control sleeve 11 is arrested in the manner described above and switch arm 15 clears lug 16. Thereafter the parts elevate in the manner described so that cone 18 actuates lower supports 1 to permit the remaining record in the stack to descend onto the turntable.

Generalizing, it will be seen that the upper and lower groups of supports, by their interengagement with a record or records in the stack, co-operate to provide a positive stop for arresting upward movement of control member 11, thereby facilitating continued cyclic operation of the tone arm. Viewed in another way, the mechanism utilizes a record or records in the stack as a positive stop to prevent the cut-off device from operating.

What is claimed is:

1. In a phonograph having a turntable and a tone arm operable cyclicly to play successive records in a stack, a record changing device comprising, a post in the center of a turntable for receiving a stack of records, means forming a support mounted on said post for movement to a position for supporting the lowest record in a stack and a retracted position, means forming a clamping element mounted on said post for movement both radially and axially thereof, operating mechanism for said support and element including first and second members relatively axially movable, means forming a yieldable connection interconnecting said members for movement together relative to said post, one of said members being operable responsive to movement thereof to shift said clamping element axially out of alignment with the lowest record in a stack and radially outwardly into clamping engagement with a center opening in a record next above the lowest in the stack, the other of said members being engageable with said support responsive to movement thereof with said one member, means providing a yieldable stop restraining axial movement of said clamping element under the action of said one member to an extent approximating the thickness of a record, whereby said stop, clamping element, the records engaged thereby and said support through engagement with the bottom record and said other member provide a static train operable to arrest movement of said other member, means operable under the influence of arrested movement of said other member to effect continued cyclic operation of the tone arm, said yieldable connection and stop facilitating continued movement of said one member when said movement of said other member is arrested, and means operable responsive to said continued movement of said one member to shift said support to retracted position to release the lowest record in the stack for descent onto the turntable.

2. The combination defined in claim 1 wherein said clamping element has a portion which, when there is only a single record in the stack, moves radially over and engages a face of the record responsive to said outward radial movement thereof so that said clamping element and record form members in the static train for effecting said arrested movement of said other member.

3. The combination defined in claim 1 wherein said support is mounted for swinging movement from said record supporting position to such retracted position, said clamping element being operable upon said continued movement of said one member to shift the records in a stack in a direction away from said support to free said support for swinging to said retracted position thereof.

4. The combination defined in claim 3 wherein said one member includes means operable in the range of movement wherein said stop yields to swing said support to said retracted position.

5. The combination defined in claim 1 wherein said first member of said operating mechanism includes a shaft axially movable within said post, said second member comprising a sleeve within said post surrounding said shaft, said yieldable connection between said members comprising spring means acting on one of said members and reacting against the other of said members.

6. In a phonograph having a turntable and a central post, a tone arm and mechanism for operating said tone arm cyclicly to play successive records in a stack, a record changing device comprising, two sets of record supports on said post, one set mounted for axial movement a distance at least approximating the thickness of a record and for generally radial movement for engaging a record, the other set mounted for generally radial movement to a record supporting position and a retracted position, operating means in said post movable for operating said first set of supports, a control member mounted for movement with said operating means through means providing a lost motion connection and being operative upon unrestrained movement thereof to influence said tone arm operating mechanism so that it discontinues cyclic operation of said tone arm, and means operable through interengagement of supports in both of said sets with a record on said post to arrest movement of said control member during continued movement of said operating means to facilitate continued cyclic operation of said tone arm while a record is on said post.

7. In a phonograph having a turntable and a central post, a tone arm and mechanism for operating said tone arm cyclicly to play successsive records in a stack, a record changing device comprising, two sets of record supports mounted on said post for movement to record supporting and retracted positions, one set being in its record supporting position and the other set being retracted while a record is being played, operating means in said post movable for operating said other set to its record supporting position during a record changing portion of the cycle while leaving said one set in its record supporting position, a control member mounted for movement with said operating means through means providing a lost motion connection and being operative upon unrestrained movement thereof to influence said tone arm operating mechanism so that it discontinues cyclic operation of said tone arm, said supports in each of said sets by their engagement with a record in the stack cooperating to provide a stop operable to arrest movement of said control member to facilitate continued cyclic operation of said tone arm while a record remains in the stack.

8. In a phonograph having a turntable and a central post, a tone arm, and mechanism for operating said tone arm cyclicly to play successive records in a stack, a record changing device comprising, means providing first and second support means for supporting records on said post, operating means in said post operably connected to said first support means through means providing a first lost motion connection, said first support means being movable generally axially with said operating means and being movably generally radially responsive to relative movement of said operating means, means providing a yieldable stop yieldably limiting axial movement of said first support means to a distance approximating the thickness of a record, said operating means being operable in initial movement to shift said first support means said distance and being operable in subsequent movement to shift said first support means radially for record engagement, said second support means being mounted for generally radial movement to a record supporting position and a retracted position, a control member mounted for movement with said operating means through means providing a second lost motion connection and being operative upon unrestrained movement thereof to influence said tone arm operating mechanism so that it discontinues cyclic operation of said tone arm, means operable through interengagement of said first and second support means with the record stack to arrest movement of said control member during continued movement of said operating means to facilitate continued cyclic operation of said tone arm while a record is on said post, said operating means upon further continued movement thereof being operable to take up said first lost motion connection and shift said stop whereby to free the records in said stack for axial movement to release said second support means, said operating means being operable upon further movement thereof to retract the freed second support means to facilitate dropping of a record into said turntable.

9. The combination defined in claim 8 wherein said first support means includes means which, when there is only a single record in the stack, moves radially over and engages a face of the record responsive to outward radial movement thereof so that said control-member-arresting-means is effective to arrest movement of said control member.

10. The combination defined in claim 8 wherein said second record support means is mounted for swinging movement from said record supporting position to said retracted position, said first support means being operable upon said further continued movement of said operating means to shift the records in a stack above the lowermost in a direction away from said second support means to free said second support means for swinging to said retracted position thereof.

References Cited in the file of this patent

UNITED STATES PATENTS

| | | |
|---|---|---|
| 2,616,705 | Leonard | Nov. 4, 1952 |
| 2,643,129 | Habegger | June 23, 1953 |